United States Patent [19]

Funakubo

[11] Patent Number: 4,916,696

[45] Date of Patent: Apr. 10, 1990

[54] LOGIC OPERATION DEVICE

[75] Inventor: Nobuo Funakubo, Hadano, Japan

[73] Assignee: Hitachi, Ltd., Tokyo, Japan

[21] Appl. No.: 188,375

[22] Filed: Apr. 29, 1988

[30] Foreign Application Priority Data

May 1, 1987 [JP] Japan .................. 62-108393

[51] Int. Cl.$^4$ .................................. G06F 15/16
[52] U.S. Cl. ............................ 371/11.3; 371/9.1; 371/68.3
[58] Field of Search .................. 371/9, 36, 62, 68, 9.1, 371/8.1, 11.1, 11.3, 68.1, 68.3

[56] References Cited

U.S. PATENT DOCUMENTS

| | | | |
|---|---|---|---|
| 4,314,349 | 2/1982 | Batcher | 371/9 |
| 4,562,575 | 12/1985 | Townsend | 371/9 |
| 4,700,292 | 10/1987 | Campanini | 371/9 |
| 4,703,421 | 10/1987 | Abrant | 371/9 |
| 4,807,228 | 2/1989 | Dahbura | 371/9 |

OTHER PUBLICATIONS

"Fail-Safe Data Processing in Railway Signaling Systems", H. J. Lohmann, pp. 374-377, Siemens Forsch.ungs- and Entwicklungsberichte, vol. 7, (1978), No. 6.

*Primary Examiner*—Michael R. Fleming
*Attorney, Agent, or Firm*—Fay, Sharpe, Beall, Fagan, Minnich & McKee

[57] ABSTRACT

A logic operation device operable at a high speed with a high reliability is disclosed. The logic operation device comprises a first, arithmetic and logic unit composed of a dynamic circuit of a precharge type, and a second, arithmetic and logic unit composed to a static circuit and having the same operational function as the first unit. When common data is supplied from an input register to the first and second units, the first unit generates a logic operation output earlier than the second unit does. The succeeding operation is therefore performed on the basis of this logic operation output from the first unit. As soon as the second unit generates an operation output, this is compared with that of the first unit. If the comparison results shows that both outputs are not the same, the subsequent operation on the basis of the logic operation output from the first unit is stopped.

30 Claims, 3 Drawing Sheets

LOGIC OPERATION DEVICE

BACKGROUND OF THE INVENTION

This invention relates to a logic operation device implemented by a large scale integrated circuit. The present invention is also directed to a logic operation process using the above logic operation device.

It is desired that a logic operation device perform the operation both at a high speed and with a high reliability. As a method for enhancing the reliability there is known a method in which two sets of the same ALU units are used. A logic operation device adopting such a dual system is provided with two ALU units to each of which common data is supplied. The operation results obtained from these ALU units are continuously compared for checking. While such a dual system can enhance the reliability, the amount of hardware is unavoidably increased because of the necessity for using two sets of the same ALU units.

In order to increase the operation speed, it is necessary to use a logic operation device including a logic circuit utilizing circuit elements capable of operating at a high speed. Furthermore, the logic operation device is required to be implemented by a large scale integrated circuit in order to shorten wires connecting the parts of the device. As a logic circuit which meets with the above requirements, there is known a dynamic circuit using, for example, a CMOS process. For example, Japanese Laid-Open Patent Application No. 58-111,436 (corresponding to U.S. patent application No. 308,072 filed Dec. 17, 1981) discloses a CMOS multistage dynamic logic circuit of a precharge type. Such a logic circuit of a precharge type operates on the basis of whether or not an n-MOS transistor draws out a charge which has been precharged by a p-MOS transistor and whose operation speed depends on the operation of the n-MOS transistor having a higher drive power than the p-MOS transistor.

With the dynamic circuit realized in the large scale integrated circuit, however, a software error is liable to occur because the charges in the precharged state tend to be inverted by charges induced by $\alpha$-rays radiated from uranium contained in the package. This software error causes the misoperation of the logic circuit of the dynamic circuit. It is, therefore, necessary to take a measure against such a misoperation since otherwise a serious damage such as a breakdown of a database would possibly occur. Accordingly, when a dynamic circuit is utilized for the construction of a logic circuit operable at a high speed, it is important that a counter measure should be taken against such a software error.

On the contrary, a logic static circuit is free of such a software error. The static circuit (CMOS logic circuit) operates by the complementary switching operation of a p-MOS transistor or n-MOS transistor at a speed determined by the p-MOS transistor having a lower drive power than n-MOS transistor. Accordingly, the logic operation device of a static circuit type cannot operate at such a high speed as attained in the dynamic circuit. However, the static circuit type operation device is free of the above-mentioned software error caused due to the inversion of the charges and can operate with a high reliability.

Thus, whilst a logic circuit of a dynamic type operates at a higher speed than a logic circuit of a static type, the reliability of the former circuit is lower than the latter circuit because of the possible occurrence of misoperation as described above.

SUMMARY OF THE INVENTION

It is, therefore, an object of the present invention to provide a logic operation device operable both at a high speed and with a high reliability.

In accomplishing the above object, the present invention provides a logic operation device comprising:
 a first, arithmetic and logic unit including a dynamic circuit of a precharge type; and
 a second, arithmetic and logic unit including a static circuit and having the same operational function as said first unit.

In the logic operation device of the present invention, the timing controller performs the timing control for the data input and output of both the first unit having a dynamic circuit of a precharge type and capable of operating at a high speed and the second unit having a static circuit and capable of operating with a high reliability. Thus, the timing controller is operable to provide the first and second units with data to be operated. Namely, after the precharge of the first unit, the timing controller performs the timing control for the data input and output so that the data is commonly supplied to the first and second units. The first unit which is composed of the dynamic circuit generates an operation output earlier than the second unit does. By using this operation output obtained from the first unit, the subsequent operations such as a parity bit operation are performed. When the second unit generates an operation output later, this is compared with that of the first unit. When the comparison shows that the operation outputs from the first and second units are the same with each other, the subsequent operation or operations are continued on the basis of the operation output from the first unit. On the other hand, when the comparison shows that the operation outputs from the first and second units are different from each other, a controller invalidates the subsequent operation results obtained on the basis of the operation output from the first unit, stops the writing of the operation results and stops the operation.

Thus, in the logic operation device according to the present invention, the operation data output obtained at a high speed from a dynamic circuit type ALU is compared with the highly reliable operation data output obtained from a static circuit type ALU to ensure both high speed and high reliability logic operations.

BRIEF DESCRIPTION OF THE DRAWINGS

Other objects, features and advantages of the present invention will become apparent from the detailed description of the preferred embodiment which follows, when considered with reference to the accompanying drawings, in which.

DESCRIPTION OF THE PREFERRED EMBODIMENTS

Figure 1:
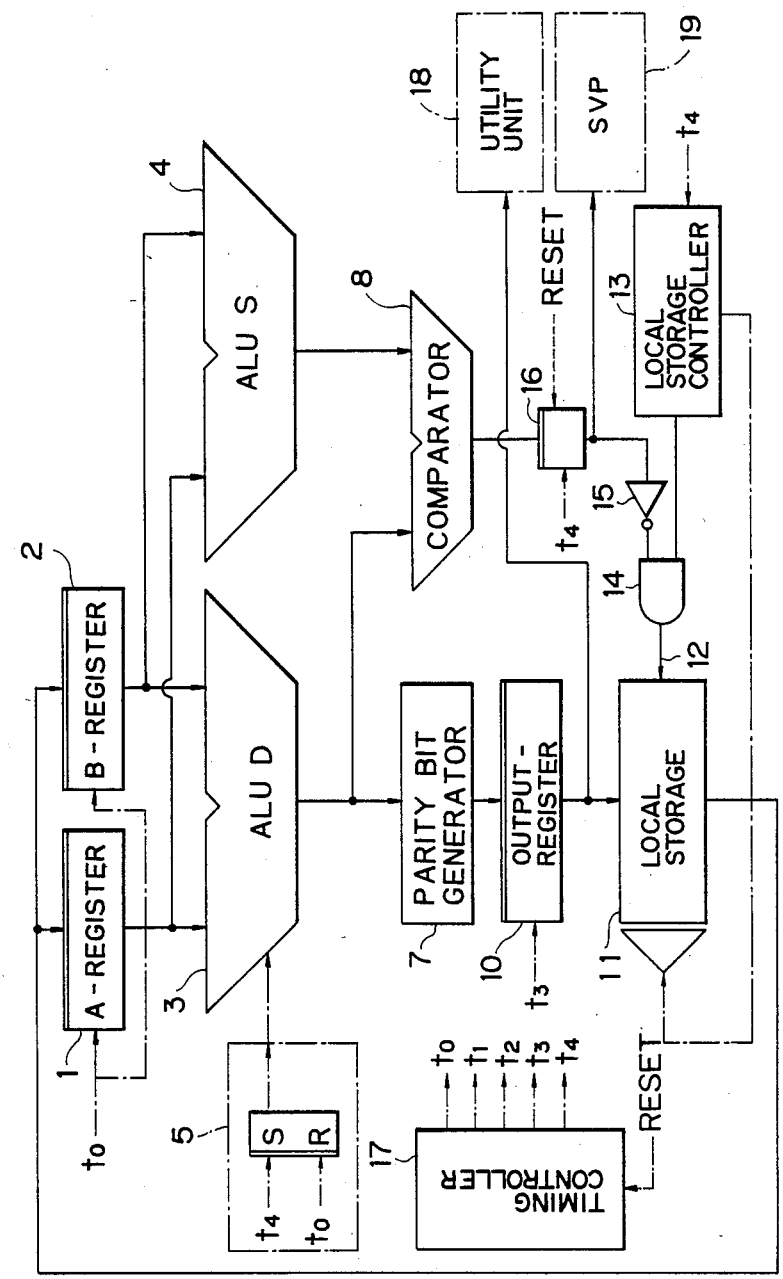
FIG. 1 is a block diagram schematically illustrating the essential part of logic operation device of one embodiment according to the present invention.

Referring first to FIG. 1 showing a preferred embodiment according to the present invention, the reference numeral 1 denotes an A-register used as a first input register and 2 denotes a B-register used as a second input register. The A-register 1 stores a group of input data (first operand data) for the logic operations and B-register 2 stores another group of input data (second operand data) for the logic operations. Indicated as 3 is a first ALU (hereinafter referred to as ALUD) composed of a dynamic circuit of a precharge type and as 4 a second ALU (hereinafter referred to as ALUS) composed of a static circuit and having the same operational function as that of the ALUD 3. To the ALUD 3 and ALUS 4 are supplied common input data to be operated from the A-register 1 and B-register 2. The reference numeral 5 designates a precharge controller adapted to generate a precharge clock to be fed to the ALUD 3. The precharging of the ALUD 3 of the dynamic circuit type is performed prior to the initiation of the logic operations. Designated as 7 is a parity bit generator arranged to add a parity bit (check bit) to the operation output data from the ALUD 3. Designated as 8 is a comparator for comparing the operation output data from the ALUD 3 and that from the ALUS 4. The operation output data from the ALUD 3 which is added with the parity bit in the parity bit generator 7 is stored in an output register 10. The reference numeral 11 indicates a local storage which includes a memory element having a plurality of addressable areas and is used as a group of general purpose registers or register file. A write control signal 12 is supplied to the local storage 11. Designated as 13 is a local storage controller adapted to generate the write control signal 12. The reference numerals 14 and 15 designate an AND gate and an inverter, respectively. The reference numeral 16 designates a discordance flag register adapted to hold a discordance flag when the comparison result in the comparator 8 shows the discordance. The reference numeral 17 designates a timing controller arranged to generate various timing signals for controlling the logic operations. The reference numeral 18 designates a utility unit, such as a memory unit, which utilizes the operation output data and 19 designates a host processing unit, such as a service processer, which monitors the logic operations.

The operation of the logic operation device having the above structure will be described below with reference to FIG. 2 which shows a timing charge explanatory of the timing of the operations.

One operation cycle in the logic operation device according to the present invention is a series of operations including reading out the data to be operated upon from the local storage 11, storing the read-out data in the A-register 1 and B-register 2, executing logic operations in the ALUD 3, adding a parity bit to the operation result data from the ALUD 3, and writing the operation output data added with the parity bit in the local storage 11. One operation cycle requires a time T. The operations of one cycle are controlled in accordance with timing signals $T_0$, $T_1$, $T_2$, $T_3$ and $T_4$ generated from the timing controller 17.

The operation of the logic operation device involving no misoperation due to a software error or the like trouble will be first described. In this case, the operation proceeds as illustrated by Operation Cycle (1) in FIG. 2.

Upon generation of the timing signal $t_0$ instructing to take the data for the logic operations in the input registers, the A-register 1 and B-register 2 store the data for the logic operations to establish the values of the input data to be processed. The data stored in the A-register 1 and B-register 2 are commonly supplied to both the ALUD 3 and ALUS 4. Since the ALUD 3 composed of a dynamic circuit operates at a higher speed than the ALUS 4 composed of a static circuit, the operation result in the ALUD 3 is established earlier than that in the ALUS 4, i.e. at the time of generating the timing signal $t_1$. The operation result of ALUD 3 is fed as the operation output data to the parity bit generator 7 and the comparator 8. The output of the parity bit generator 7 is established at the time of generating the timing signal $t_3$. The output register 10 receives and holds the established data upon receipt of the timing signal $t_3$.

The operation result in the ALUS 4, on the other hand, is established later than that in the ALUD 3, i.e. at the time of generating the timing signal $t_2$. The operation result of the ALUS 4 is fed as the operation output data to the comparator 8 where the operation output data from the ALUD 3 and from the ALUS 4 are commenced to be compared as soon as the timing signal $t_2$ is generated. The result of the comparison is established at the time the timing signal $t_4$ is generated. In the operation according to Cycle (1), the comparison result shows that the operation output data of the ALUD 3 and ALUS 4 are the same. Therefore, discordance flag is not generated. Rather, a signal representing logic "0" is taken in the discordance flag register 16 from the comparator 8 when the timing signal $t_4$ is generated. Consequently, the inverter 15 outputs logic "1" to turn the AND gate ON, so that the write control signal 12 is supplied through the AND gate from the local storage controller 13 to the local storage. As a result, the operation output data of the output register 10 is written in the local storage 11.

Upon receipt of the timing signal $t_4$ in this operation cycle and up to the timing signal $t_0$ in the next operation cycle, the precharge controller 5 generates a precharge clock. During the generation period of the precharge clock, the ALUD 3 composed of the dynamic circuit of the precharge type is precharged.

Figure 2:
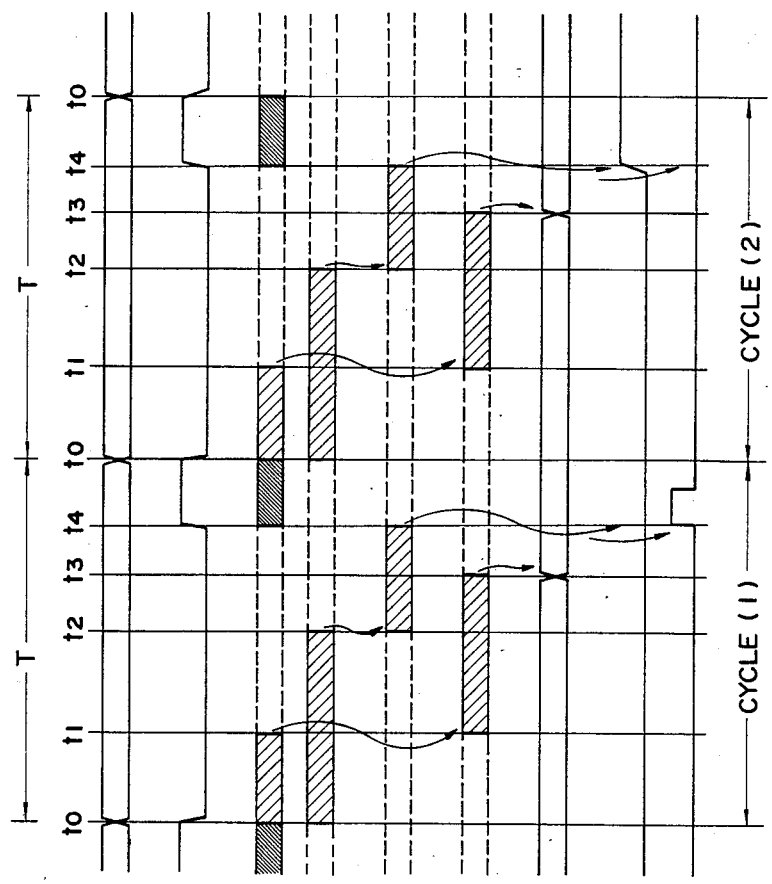
FIG. 2 is a timing charge explanatory of the timing of logic operation.

Operation Cycle (2) of FIG. 2 shows the case where the ALUD 3 encounters a misoperation caused by a software error so that the comparison result shows that the operation output data of the ALUD 3 and ALUS 4 are not the same. Operation Cycle (2) in accordance with the timing signals proceeds as follows.

From the time of generating the timing signal $t_0$ to the time of generating the timing signal $t_3$, the logic operation device of the present invention for Operation Cycle (2) in the same manner as in Operation Cycle (1). Also, the comparison result in the comparator 8 is taken by and established in the discordance flag register 16 in the same manner as in Operation Cycle (1) when the timing signal $t_4$ is generated. In this case, however, since the comparison result shows that the operation output data of the ALUD 3 and ALUS 4 are not the same, the discordance flag is as logic "1" is supplied to and held by the discordance flag register 16. As a consequence, the inverter 15 outputs logic "0" to disable the AND gate 14, so that the write control signal 12 from the local storage controller 13 is prevented from being fed to the local storage 11. Therefore, the operation output data of the output register 10 are not written in the local storage 11.

When the discordance flag register 16 outputs the discordance flag as logic "1", the host processing unit 19 detects the generation of the discordance flag, i.e. the occurrence of the misoperation of the logic operation device. Then, the host processing unit 19 stops the next cycle from proceeding and instructs another device to cause the logic operation device to initiate a retrying operation. At the same time the host processing unit 19 provides the timing controller 17 and the discordance flag register 16 with a reset signal, the logic operation device commences the retrying operation.

Thus, even when the logic operation device misoperates, erroneous operation output data are not written in the local storage 11. Therefore, the data stored in the local storage 11 are not destroyed, so that the logic operation device can continue the logic operations without troubles when it enters in the retrying of the logic operations upon reset of the discordance flag register to logic "0". When the discordance flag is not detected in the retrying operation, the logic operation device executes the logic operation of the next cycle to proceed with further operations.

The logic operation device according to the present invention discontinues its operation when an error occurs in the ALU composed of the dynamic circuit of the precharge type and, therefore, it enhances its reliability remarkably. Furthermore, since one operation cycle in the logic operation device according to the present invention is shorter by the difference between the time of generation the timing signal $t_2$ and the time of generating the timing signal $t_1$ as compared with a case wherein the logic operation device is composed only of the static circuit, the operation can be executed at a high speed.

Figure 3:
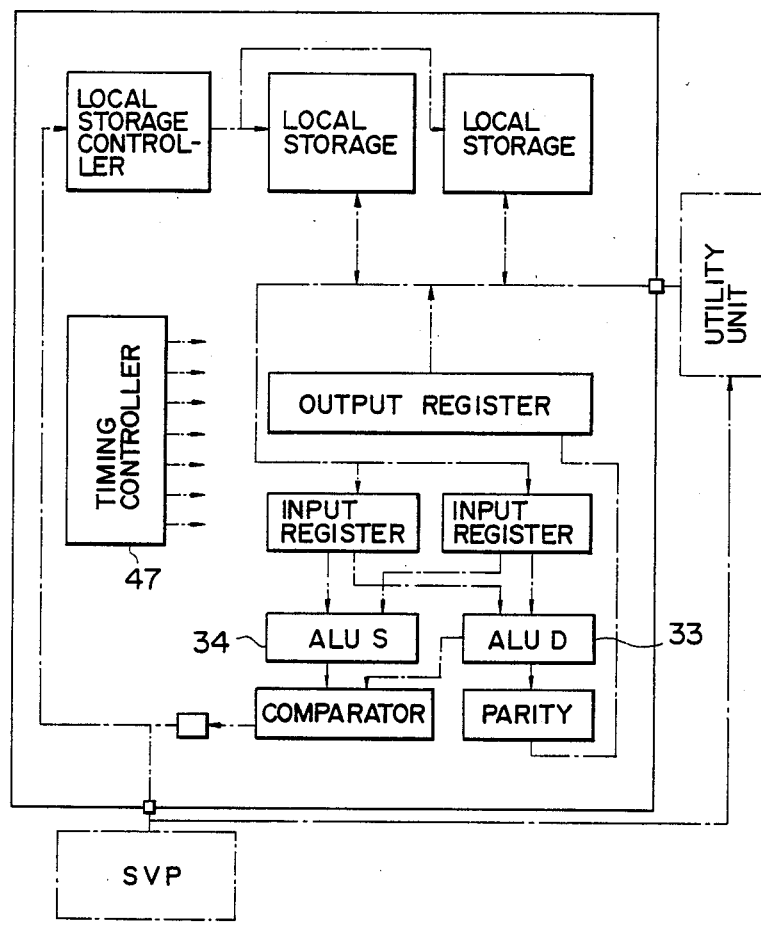
FIG. 3 is a plan view schematically illustrating the layout of a large scale integrated circuit embodying the logic operation device of the present invention.

FIG. 3 is a plane view showing the layout of the large scale integrated circuit embodying the logic operation device of the preferred embodiment of this invention. The logic operation device is implemented in the large scale integrated circuit so as to increase the operation speed by shortening the length of wires for connecting the parts of the device. The logic operation device implemented in the large scale integrated circuit is designed by using a standard cell method such that an internal logic cell, and I/O buffer cell, a RAM macrocell, an ALU macrocell etc. which have been developed as a cell family are used for the respective parts of the logic operation device to form the large scale integrated circuit according to a CMOS process. As a result, in the semiconductor chip on which the logic operation device is realized by the large scale integrated circuit, a first ALUD 33 composed of a dynamic circuit implemented by the ALU macrocell is arranged in the right portion of the chip and second ALUS 34 composed of a static circuit implemented by the internal logic cell is arranged in juxtaposition to the first ALUD 33, as shown in FIG. 3. A timing controller 47 is arranged at the center of the chip so that the wire lengths are uniformized to reduce clock skews since multiphase clocks are used in various portions in the integrated circuit having a large chip area.

In general, when a conventional logic operation device is implemented by one-chip large scale integrated circuit, a plurality of signal wires must be arranged for drawing out the data in the ALU in order to check the operation. According to the logic operation unit device of the present invention, since there are arranged two ALUs and the comparator for comparing the data of there two units, only one signal wire is arranged for drawing out the comparison data from the integrated circuit by utilizing the discordance flag data supplied from the comparator as the data for checking the operation, thereby reducing the number of signal output pins for checking the operation.

While this invention has been described in its preferred embodiment, it is to be understood that various changes and modifications may be made in this invention without departing from the spirit and scope thereof.

As described above, this invention enables high speed operation by using the ALU composed of the dynamic circuit of a precharge type. Furthermore, since the logic operation device of this invention checks its operation by using the double ALU system in which the reliable ALU composed of the static circuit is additionally employed and by comparing the data between these two units, an accident such as breakdown of the database can be prevented even when the dynamic circuit misoperates, the present invention provides a logic operation device of a high reliability.

What is claimed is:

1. A logic operation device for performing ALU operational functions upon data, comprising:
   a first, arithmetic and logic unit constructed as a dynamic circuit of a precharge type for performing operational functions on the data and providing an operation output;
   a second, arithmetic and logic unit constructed as a static circuit for performing the same operational functions on the data and providing an operation output;
   means for feeding the data simultaneously and commonly to said first and second arithmetic and logic units; and
   means for controlling said second arithmetic and logic unit for having the same operational function as said first arithmetic and logic unit.

2. A logic operation device according to claim 1, further comprising:
   parity bit generator means for adding a parity bit to the operation output of said first arithmetic and logic unit; and
   said means for controlling including a timing controller for controlling the timings for the precharge of said first arithmetic and logic unit and for data input and output of said first and second arithmetic and logic units.

3. A logic operation device according to claim 1, further comprising:
   a comparator means for comparing the operation output of said first arithmetic and logic unit with that of said second arithmetic and logic unit and producing a correlated discordance flag output;
   discordance flag register means for receiving and holding the output of said comparator means; and
   said means for feeding including an input register means for providing said first and second arithmetic and logic units with common data; and
   said means for controlling including a timing controller for controlling the timings for the precharge of said first arithmetic and logic unit and for data input and output of said first and second arithmetic and logic units.

4. A logic operation device according to claim 3, further comprising:
   parity bit generator means for adding a parity bit to the operation output of said first arithmetic and logic unit and producing output data with parity;
   output register means for receiving and holding the output data with parity from said parity bit generator means;

local storage means for storing the output data with parity of said output register means in response to a write control signal;

local storage controller means for providing the write control signal to said local storage means; and controller means for suppressing the write control signal from said local storage controller means in accordance with the discordance flag output of said comparitor means.

5. A logic operation device according to claim 4, wherein said local storage means comprises a group of general purpose register, each having a plurality of addressable areas, and wherein said local storage controller means provides an address control signal and a read control signal to said local storage means.

6. A logic operation according to claim 4, wherein said timing controller producing, in turn, a precharge control timing signal supplied to said first arithmetic and logic unit, a data take-in timing signal supplied to said input register means, a data take-in timing signal supplied to said output register means and a control timing signal supplied to said local storage controller means.

7. A logic operation device according to claim 6, including a host processing unit connected to receive the output of said discordance flag register means, and said host processing unit sending a reset signal to reset said timing controller and said discordance flag register means in response to the discordance flag output of said discordance flag register means.

8. A logic operation device according to claim 7, wherein said host processing unit is a service processor means for controlling the operational functions.

9. A logic operation device according to claim 6, wherein said output register means receives the output data with parity from said parity bit generator means and supplies the output data with parity to said local storage means and to a utility unit.

10. A logic operation device according to claim 9, wherein said utility unit is a memory unit.

11. A logic operation process using a logic operation device which comprises a first, arithmetic and logic unit including a dynamic circuit of a precharge type, and a second arithmetic and logic unit including a static circuit and having the same operational function as said first unit, said process comprising:

a first step of taking operation data in an input register and supplying them commonly to said first and second units;

a second step of adding a parity bit to the operation output of said first unit and comparing the operation output of said first unit with that of said second unit to output a comparison result; and a third step of writing, in a local storage, the output data being the operation data of said first unit added with the parity bit when the comparison result shows that the operation data of said first and second units are the same and preventing said writing when the comparison result shows that the operation data of said first and second units are not the same.

12. A method of operating upon data within a single integrated circuit, comprising:

substantially simultaneously operating upon common data with the same arithmetic logic operational functions in a dynamic arithmetic logic unit and in parallel in a static arithmetic logic unit, with the dynamic arithmetic logic unit performing arithmetic logic operational functions substantially faster than the same arithmetic logic operational functions are performed in said static arithmetic logic unit and with said static arithmetic logic unit performing said arithmetic logic operational functions with substantially less probability of software error than said dynamic arithmetic logic unit;

processing the output of only said dynamic arithmetic logic unit to produce processed data, with at least a substantial portion of the time of said processing occurring during the time that the arithmetic logic operational function is being performed in said static arithmetic logic unit;

comparing the output of said dynamic arithmetic logic unit with the output of said static arithmetic logic unit and producing a correlated discordance signal;

storing said processed data in response to said discordance signal only when the outputs of said dynamic arithmetic logic unit and static arithmetic logic unit are the same; and repeating all of said preceding steps with the same data and same arithmetic logic operational function in response to said discordant signal when the output of said dynamic arithmetic logic unit does not equal the output of said static arithmetic logic unit so that arithmetic logic operational functions may be performed at the speed of a dynamic arithmetic logic unit and with the software reliability of a static arithmetic logic unit.

13. The method according to claim 12, further including the step of precharging only the dynamic arithmetic logic unit subsequent to said step of comparing, during said step of storing, and prior to said step of repeating.

14. The process according to claim 12, wherein said step of comparing is at least partially completed during said step of processing.

15. The method according to claim 12, including generating, during a first operation cycle, a first timing signal for simultaneously inputting the data to each of said dynamic arithmetic logic unit and said static arithmetic logic unit, a second subsequent timing signal for initiating said processing with the output of said dynamic arithmetic logic unit, a third subsequent processing signal for initiating said comparing of the outputs of said dynamic and static arithmetic logic units, and a fourth subsequent timing signal for initiating said producing of said discordance signal; and repeating the generating of said timing signals, in order and at the same timing, for subsequent operation cycles.

16. The method according to claim 15, including generating a write signal; logically combining said write signal and said discordance signal for producing a write control signal initiating said storing.

17. The method according to claim 16, further including generating an additional timing signal, subsequent to said first, second and third timing signals, for initiating said storing of the processed data prior to generation of said write control signal.

18. The method according to claim 15, including, in response to said discordance signal indicating that the output of said dynamic arithmetic logic unit is not the same as the output of said static arithmetic logic unit, resetting the discordance signal and timing signals to produce said first timing signal.

19. A single chip integrated circuit digital operation device, comprising:

a dynamic arithmetic logic unit having an input and an output for performing arithmetic and logic operational functions;

a static arithmetic logic unit having an input and an output for performing said arithmetic and logic operational functions at a substantially slower speed than said dynamic arithmetic logic unit and with substantially less probability of software error than said dynamic arithmetic logic unit;

register means for simultaneously inputting common data only to each of said dynamic and static arithmetic logic unit inputs;

comparator means comparing the outputs of said dynamic and static arithmetic logic units and producing a correlated discordance signal output;

processing means for processing only the output of said dynamic arithmetic logic unit independently of said static arithmetic logic unit; and means for controlling said register means, each of said arithmetic logic units, said comparator means, and said processing means for repeating the arithmetic logic operational functions, processing and comparing on the same input data when said discordance signal indicates that the output of said arithmetic logic units is not the same.

20. A device according to claim 19, further comprising:

timing controller means for producing repetitive cycles of timing control signals, with each cycle including a first timing control signal for simultaneously feeding the common data from said register means into the input of each of said arithmetic logic units in parallel, a second timing signal for starting said processing means for the processing of the output of said dynamic arithmetic logic unit, a third timing signal for controlling said comparator means for initiating the comparison of the outputs of said arithmetic logic units, a third timing signal for producing a control signal for operating said means for controlling in response to the discordance signal, all in the order stated.

21. The device according to claim 20, further including local storage means responsive to said control signal for storing the processed signal output from said processing means only when said control signal indicates that the output of said arithmetic logic units are the same.

22. The device according to claim 20, wherein said single chip integrated circuit has an external terminal receiving said control signal.

23. The device according to claim 22, wherein said discordance signal is directly connected to said external terminal.

24. The device according to claim 23, wherein said integrated single chip has external terminal means connected to receive the output of said processing means.

25. The device according to claim 24, combined with a host processing unit sequentially providing a plurality of instructions to be executed in sequential cycles of said single chip integrated circuit device, and being responsive to said discordance signal indicating that the outputs of said arithmetic logic units are not the same to automatically repeat the previous instructions prior to beginning the next instruction.

26. The combination according to claim 25, wherein said host processing unit is exterior of said single chip integrated circuit.

27. The apparatus or claim 26, wherein said host processing unit provides a reset signal, in response to said discordance signal indicating that the output of said arithmetic logic units are not the same; said timing controller means being responsive to said reset signal for immediately generating said first timing control signal; and means responsive to said reset signal for resetting said discordance signal.

28. The device according to claim 27, further including local storage means for storing data to be operated upon and outputting the data to be operated upon to said register means, and for storing the output of said processing means in response to a write signal and thereby destroying the data that has just been operated upon; controller means for producing a write signal; logic means responsive to said write signal and said discordance signal for producing a write control signal for said local storage means only when said discordance signal indicates that the outputs of said static and dynamic arithmetic logic units are the same;

said local storage means, upon receiving said first timing signal, outputting the same data as on the previous cycle to said register means when no write control signal was received in the preceding cycle, and outputting the next data to be operated upon when a write signal was received in the preceding cycle.

29. A method of testing a single chip integrated circuit, comprising:

substantially simultaneously operating upon common data with the same arithmetic logic operational functions in a first arithmetic logic unit and in parallel in a second arithmetic logic unit within said circuit;

processing the output of only one of said arithmetic logic units to produce processed data within said circuit;

comparing the output of said first arithmetic logic unit with the output of said second arithmetic logic unit and producing a correlated discordance signal within said circuit;

storing said processing output within said circuit;

placing the discordance signal on a single external terminal for the circuit; and externally testing the operation of said one arithmetic logic unit by sampling the discordance signal on the external terminal.

30. A single chip integrated circuit digital operation device, comprising:

a first arithmetic logic unit having an input and an output for performing arithmetic and logic operational functions; a second arithmetic logic unit having an input and an output for performing said arithmetic and logic operational functions;

register means for simultaneously inputting common data only to each of said arithmetic logic unit inputs;

means comparing the outputs of said arithmetic logic units and producing a correlated discordance signal output;

means for processing only the output of said first arithmetic logic unit independently of said second arithmetic logic unit; and a single external test terminal connected to receive said discordance signal.

* * * * *